United States Patent

Czaplewski

[11] Patent Number: 5,380,145
[45] Date of Patent: Jan. 10, 1995

[54] ADJUSTABLE WIDTH LOADING RAMP MECHANISM

[76] Inventor: Alfred Czaplewski, 4835 J St., Lincoln, Nebr. 68510

[21] Appl. No.: 130,660

[22] Filed: Oct. 1, 1993

[51] Int. Cl.6 ............................................. B65G 67/02
[52] U.S. Cl. ................................ 414/537; 14/71.1; 193/41
[58] Field of Search ............... 414/537, 538; 296/61; 182/88, 97, 127; 14/71.1, 69.5; 193/38, 41

[56] References Cited

U.S. PATENT DOCUMENTS

| | | | |
|---|---|---|---|
| 3,517,791 | 6/1970 | Miles | 414/537 X |
| 3,756,440 | 9/1973 | Raap et al. | 414/537 |
| 3,977,545 | 8/1976 | Lloyd | 414/537 |
| 4,003,483 | 1/1977 | Fulton | 214/85 |
| 4,098,414 | 7/1978 | Abiera | 214/85 |
| 4,127,201 | 11/1978 | Baumann | 214/85 |
| 4,478,549 | 10/1984 | Stelly | 414/537 |
| 4,596,417 | 1/1986 | Bennett | 296/50 |
| 4,668,002 | 5/1987 | Hanson | 414/537 X |
| 4,700,421 | 10/1987 | Gladney | 14/69.5 |
| 4,795,304 | 1/1989 | Dudley | 414/537 |
| 4,864,673 | 9/1989 | Adaway et al. | 296/61 X |
| 4,923,360 | 5/1990 | Beauchemin | 414/537 |
| 5,035,565 | 7/1991 | White | 14/71.1 X |

Primary Examiner—Michael S. Huppert
Assistant Examiner—Stephen Gordon
Attorney, Agent, or Firm—Philip J. Lee

[57] ABSTRACT

A loading ramp mechanism comprises two ramps and the support system therefor such that the ramps may be moved from a storage position in which the ramps are on edge and horizontal and parallel proximate to each other below the rear edge of a truck load bed, to a deployed position in which the ramps are secured at one end at the rear of the cargo bed of the small truck and are laterally adjustable. The support system comprises two support rods each having two sections flexibly joined, the first section being rigidly mounted in a vertical position and the second section being releasably supported in a horizontal position and capable of assuming a vertical position on the same axis with the first vertical section. Each ramp member at one end slidably receives a support rod and can be supported by either the horizontal second section when deployed or the vertical first section when stored. When stored, the ramp sections are pinned together and to a frame, thereby locking the ramps and preventing accidental deployment.

7 Claims, 4 Drawing Sheets

ADJUSTABLE WIDTH LOADING RAMP MECHANISM

BACKGROUND OF THE INVENTION

A. Field of Invention

The present invention relates generally to ramp mechanisms for loading items into the load bed of trucks, and more particularly to a new and improved loading ramp mechanism for loading wheeled vehicles of various wheel base widths.

B. Description of Related art

A number of loading ramp devices have been designed for use as ramps for the purpose of assisting the placement of cargo loads into the load bed of a small truck, particularly trucks commonly known as pick-up trucks. Many small trucks are not ordinarily equipped with built in loading ramps due to the compact size and low cost of the truck and the desirability of maximizing the available cargo space. Often the cargo to be loaded is quite difficult or impossible to load without the assistance of a lift or ramp. This is particularly true of motorized wheeled equipment such as lawn tractors which tend to be quite heavy while being small enough to be conveniently transported in the cargo bed of a small truck, provided loading and unloading can be performed without undue difficulty. The desired features of a loading ramp device are that it is of variable width and capable of being stored compactly as an integral part of the truck without reducing the available load bed. Known ramp devices commonly are either removable, being designed to be detached when not in use and stored in the cargo space, or built into the load bed floor, walls or both. Such known ramp devices require use of storage space within the cargo area and thereby reduce the load carrying capacity of the truck on which they are used. One means of avoiding storage of the ramp device in the cargo bed is shown in U.S. Pat. No. 4,003,483 to Fulton which discloses a tailgate capable of being pivoted into position for use as a ramp. Since the usual tailgate is less than two feet in height, the Fulton device as a ramp would not be wide enough for loading most wheeled vehicles excepting those of the smallest wheelbase width. A somewhat similar device is disclosed in U.S. Pat. No. 4,596,417 to Bennett having the same dual functionality of tailgate and ramp limiting the usefulness of the device as a ramp by reason of the width being limited to the height of the tailgate which is generally less than the width required to load wheeled equipment. All ramp devices that are of a fixed width are thereby limited in their usefulness, and are only useful as walkways. One reason for some of the known ramp design particulars is the perceived need to either replace the tailgate function of restraining loaded cargo or to load onto the lowered tailgate rather than directly into the load bed.

SUMMARY OF THE INVENTION

The device of the present invention comprises two ramp members that are freely positionable along the rear of the cargo bed of a small truck to which the device is attached. The ramp members, when not deployed in use are folded onto a frame and are of an overall shape and size similar to conventional bumpers used for pick-up and other light trucks, extending across the rear of the vehicle. The ramp frame is mounted directly to the truck frame, generally in the same manner as the bumper which is removed to allow installation of the device. Alternatively, the ramp frame may include a drawbar for temporary attachment by means of a conventional trailer hitch. The ramp frame is as wide as the opening to the cargo bed and comprises a vertical mounting plate that is as high as the ramp members are wide and a horizontal base at 90 degrees to the bottom of the mounting plate, the ramp frame having an "L" shaped cross-section. The base plate of the ramp frame provides a base to which two ramp support rods are fixed, one at either end of the ramp frame. The mounting rods are identical and are formed of two sections. Each first rod section is approximately as long as the ramp members are wide and is directly and rigidly fastened to an end of the base plate of the ramp frame, one rod being attached to each end of the base plate. The first rod sections are normal to the base plate so as to extend upward, parallel to the mounting plate, for the height of the device. The first section is joined to the second section at a flexible joint capable of rotating through at least 90 degrees, from straight to a 90 degree angle. The second mounting rod sections extend approximately one half the length of the device, from the flexible joints to an end that is releasibly supported by a bracket at or near the horizontal mid-point of the mounting plate at the top side of the mounting plate. Each support rod is slidingly restrained within one end of a ramp member each of which is accordingly allowed to slide along a support rod at 90 degrees thereto. When the ramp member is supported by the first rod section or by vertically positioned second rod section, the ramp member assumes a horizontal position on edge with the surface of the ramp member being vertical. When the ramp member is supported by the second rod section and the second rod section is in its horizontal position, the surface of the ramp member assumes a laterally horizontal aspect and may pivot as the outer end, that in this position extends rearward from the frame, may be raised or lowered as desired. The ramp members are generally as long and wide as the mounting plate of the ramp frame with the exception that one ramp member is narrower than the other by twice the gauge of the ramp member material to allow the nesting of the narrower ramp member in side the wider ramp member. Each ramp member is formed of rectangular sheet of metal with each longitudinal edge turned 90 degrees to provide a side strip for additional strength and support when bearing a load. The surface of the ramp members are generally flat and may be roughened to provide traction and may be indented to assist in guiding wheels of a wheeled vehicle. Both side strips extend in the same direction and are inward when the ramp members are not in use and are folded and are downward when the ramp members are deployed for use. Each ramp member is slidingly supported by a support rod which is inserted through holes in one end of the side strips at the end of the ramp member that remains adjacent to the truck. When the device is not in use, the ramp members are supported by the first support rod sections and are parallel to the ramp frame extending laterally across the rear of the truck directly below the rear edge of the cargo bed. The narrower of the two ramp members is pivoted on the first support rod section into place before the wider ramp member to allow both to be folded flat against the mounting plate. The second support rod sections are stored in a horizontal position with the unattached end secured by the support bracket. The ramp members may be secured in the folded position by means of a pin inserted into holes in the ramp member side strips and the base plate of the ramp frame, which holes are only aligned when the ramp members are properly folded. To deploy the ramp members the second support rod sections are first detached from the support bracket and brought to a vertical position and then the ramp members are lifted onto the second support rod sections which are then returned to the horizontal position and secured by the support bracket. Once the truck ends of both ramp members are supported by the second support rod section, the other end may be placed on the ground, loading dock or other surface by vertically pivoting the ramp members on the second support rod sections. Since the device provides for loading directly into the load bed, the tailgate, if any, must be removed or swung out of the way before loading. The lateral location of the ramp members may be adjusted as desired or required for the particular loading task to be performed by sliding the ramp member laterally along the second support rod section. For example the two ramp members may be placed in close proximity to each other to allow the device to be used as a walkway by a person or as a ramp for a vehicle with a single wheel or narrow wheel base. Conversely, the ramp members may be adjusted away from each other as is needed to provide support for any width of any wheeled vehicle that may be accommodated by the cargo bed. The ramp members are stored without limiting or reducing the load area and the device is of continuously adjustable width to be versatile and universally useful.

The purpose and intent of the present invention is to provide a new and improved mechanism for loading wheeled vehicles of various wheel bases into the rear load bed of a small truck.

A further purpose and intent of the present invention is to provide a new and improved loading mechanism of adjustable width and capable of use as an ordinary ramp.

Another and further purpose and intent of the present invention is to provide a loading mechanism with the aforesaid capacities and being compact and without limiting or reducing the available space in the truck bed.

Other objects and advantages of the invention will become apparent from the Description of the Preferred Embodiment and the Drawings and will be in part pointed out in more detail hereinafter.

The invention consists in the features of construction, combination of elements and arrangement of parts exemplified in the construction hereinafter described and the scope of the invention will be indicated in the appended claims.

DESCRIPTION OF THE PREFERRED EMBODIMENT(S)

Figure 1:
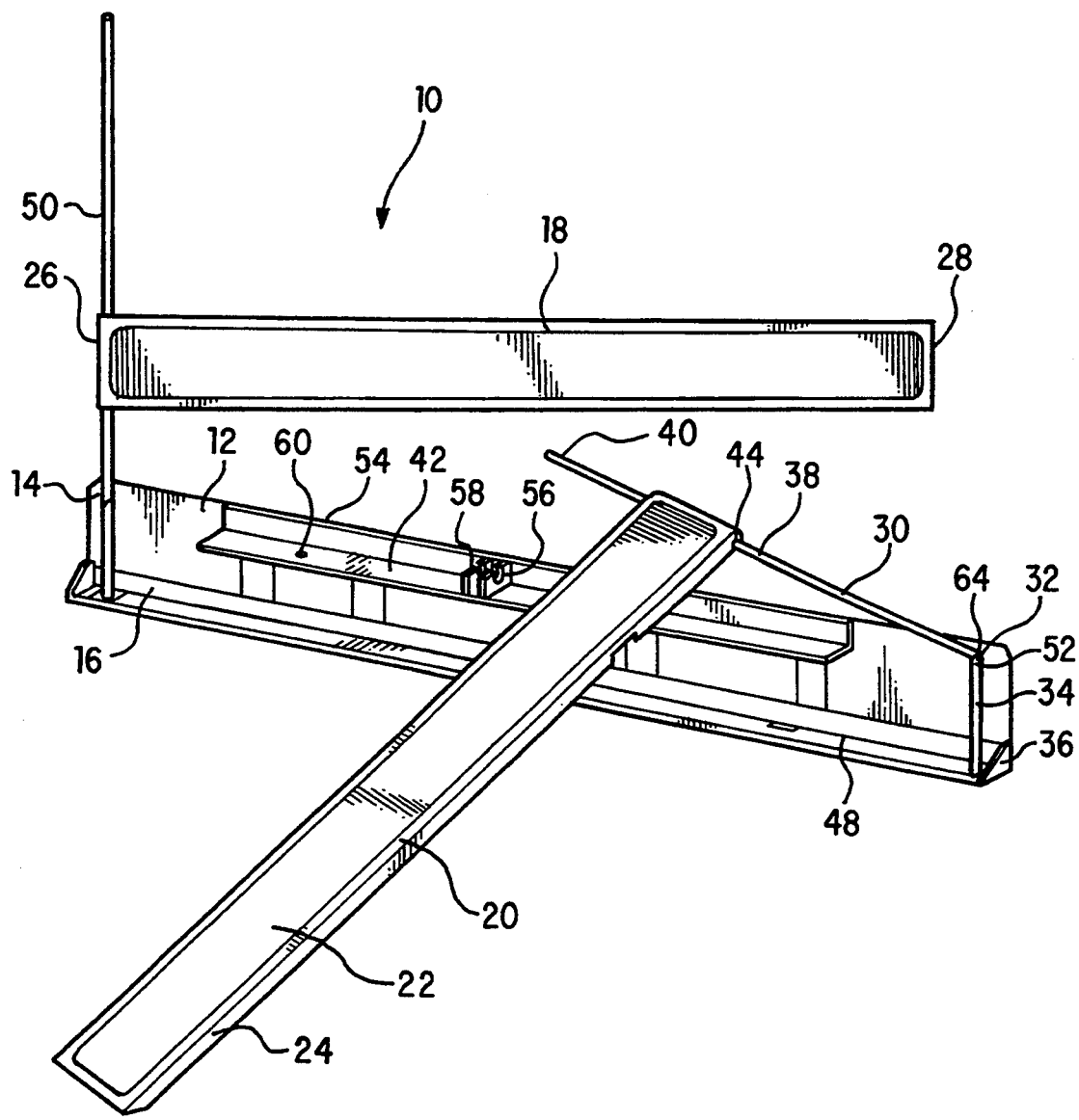
FIG. 1 is a rear view of the preferred embodiment of a loading mechanism constructed in accordance with the present invention, showing the loading mechanism unconnected to a motor vehicle and partially deployed.
Figure 2:
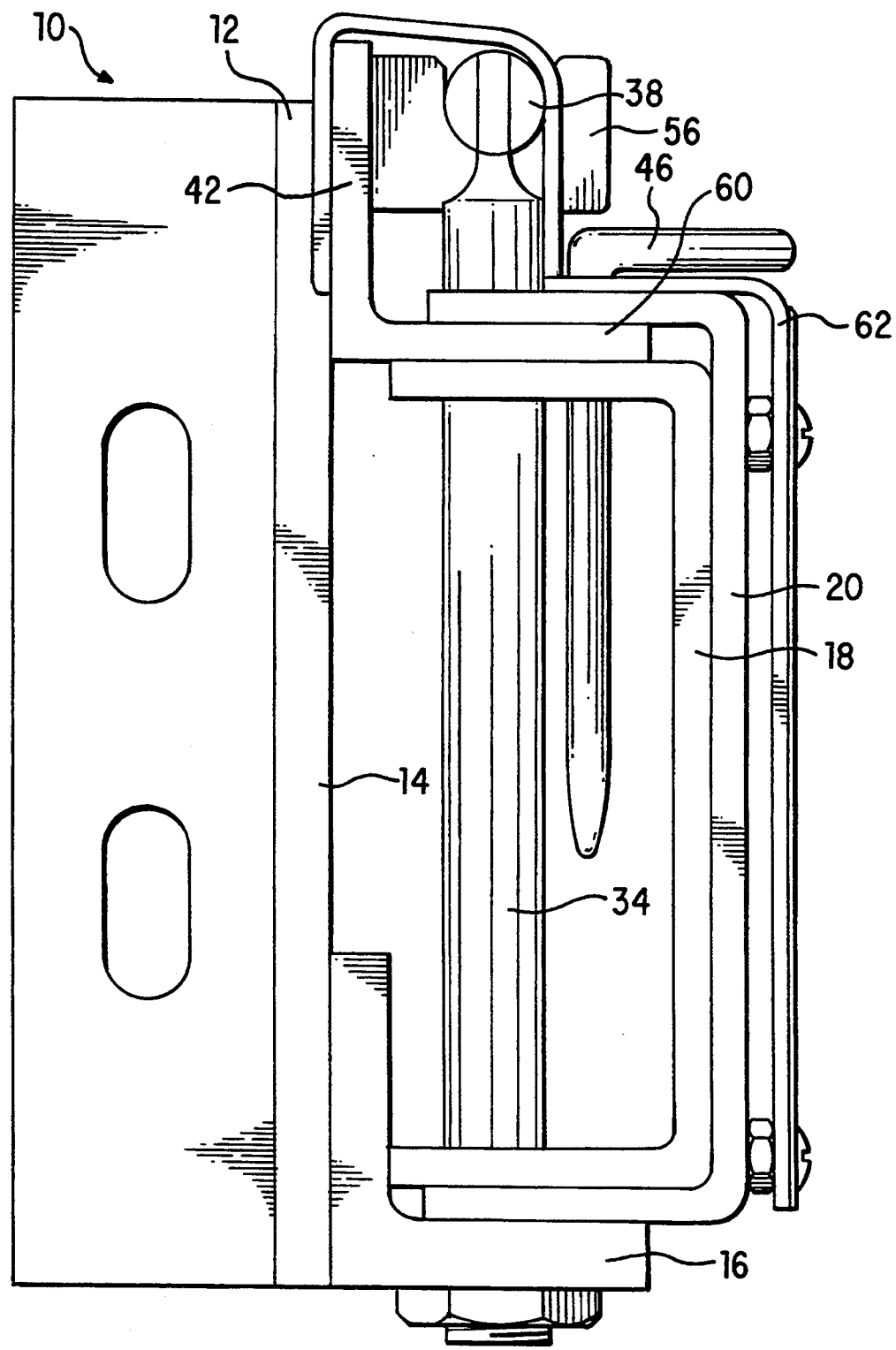
FIG. 2 is a side view of the preferred embodiment of a loading mechanism constructed in accordance with the present invention, showing the unconnected loading mechanism with ramps in storage position.
Figure 3:
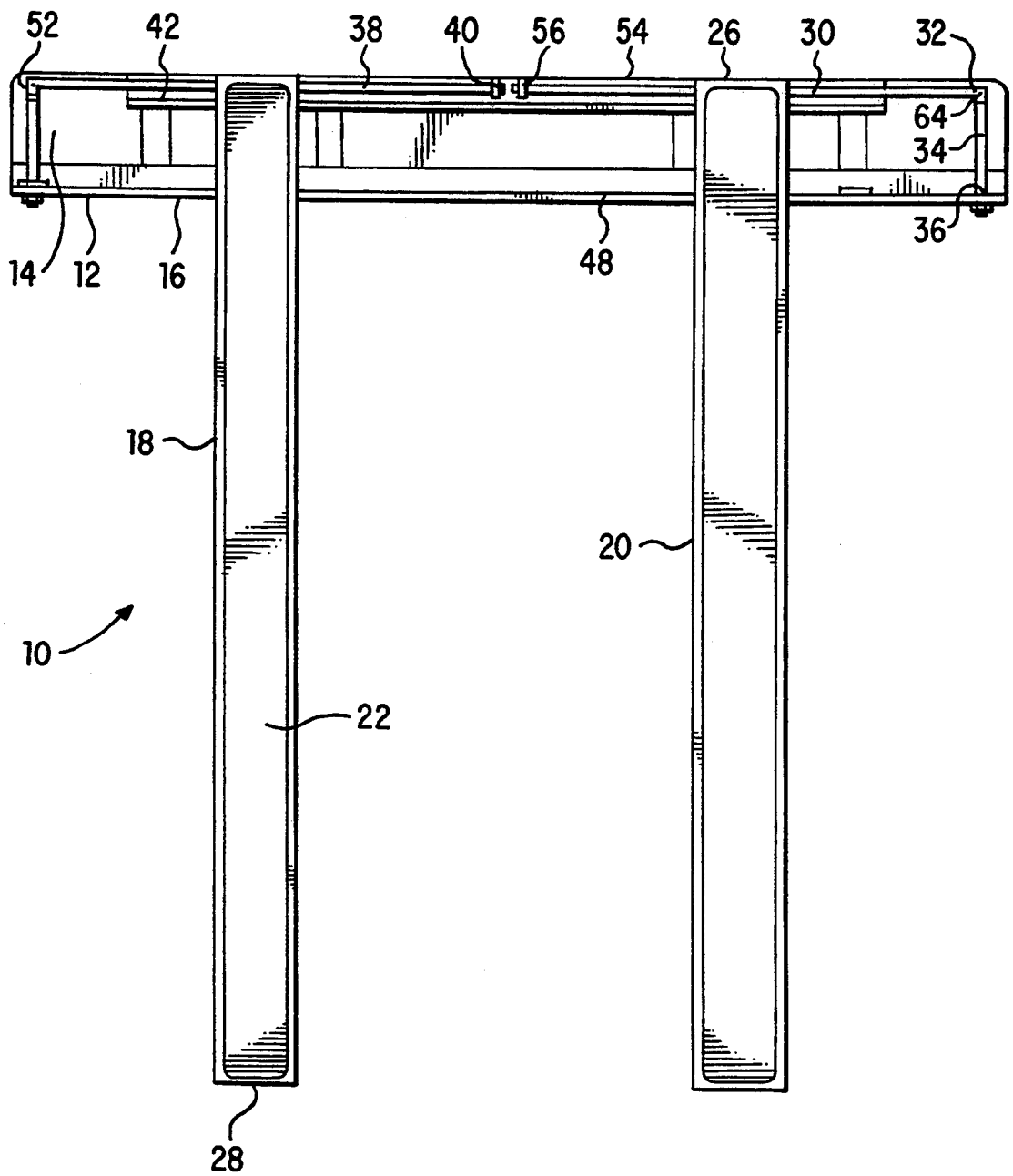
FIG. 3 is a rear view of the preferred embodiment of a loading mechanism constructed in accordance with the present invention, showing the loading mechanism unconnected to a motor vehicle, with ramps fully deployed.
Figure 4:
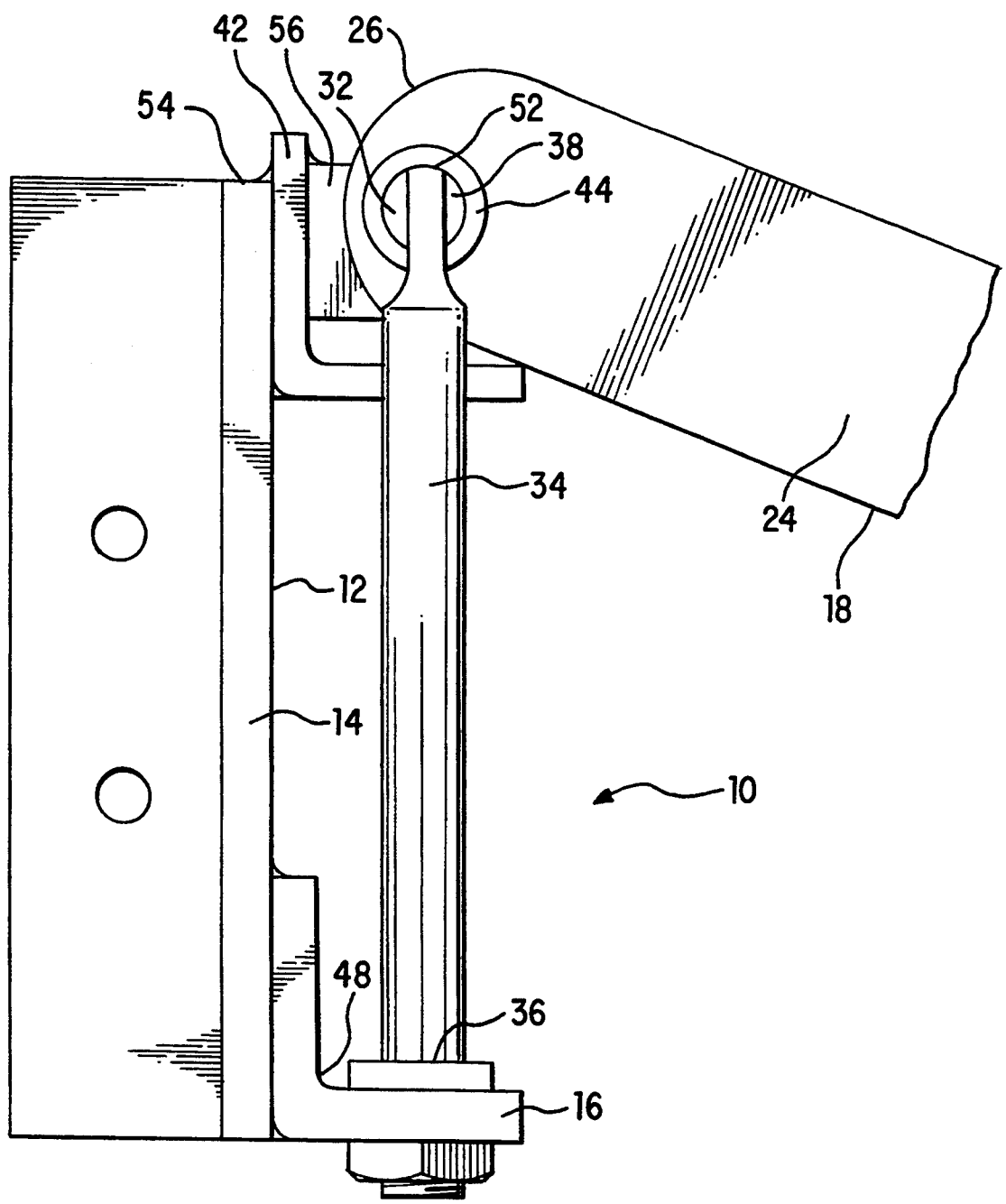
FIG. 4 is a partial side view of the preferred embodiment of a loading mechanism constructed in accordance with the present invention, showing the unconnected loading mechanism with ramp fully deployed and partially shown.

With reference to the Drawings wherein like numerals represent like parts throughout the Figures, The preferred embodiment of a loading mechanism in accordance with the present invention is generally designated by the numeral 10 in FIGS. 1 and 2. The illustrated preferred embodiment of loading mechanism 10 includes a frame 12 comprising a mounting plate section 14 and a base section 16, the mounting base section 14 and base section 16 being of the same length and joined at a 90 degree angle on a common longitudinal edge 48 such that frame 12 has a "L" shaped cross section. In the illustrated preferred embodiment of loading mechanism 10, the frame 12 is as wide as desirable being generally as wide as the opening to the load bed of a typical small truck (not shown) to which the loading mechanism 10 may be attached. To aid in the description of the loading mechanism 10, the relative directions vertical, horizontal, height, width, depth, forward, rearward, all retain the usual connotations and are applied in the description in reference to loading mechanism 10 as it would be positioned when mounted upon the rear of a small truck immediately below and proximate to the rear edge of the load bed thereof in the place commonly reserved and used for the position of the rear bumper on such vehicle. The mounting plate frame section 14 is a generally flat rectangular plate which when installed is vertical with one planar side toward the front of the vehicle and the other planar side toward the rear of the vehicle. Mounting plate frame section 14 is joined to the base plate section 16 at the bottom edge of the mounting plate section 14 and projects rearward therefrom. The height of the mounting plate frame section 14 is, in the preferred embodiment, approximately 6 to 8 inches but may vary from a lower limit dictated by utility and upper limit dictated by considerations of safety and available space depending upon the dimensions of a truck to which mechanism 10 may be attached. Loading mechanism 10 additionally comprises two ramp members 18 and 20, each of which are formed as a generally flat rectangular sheet with both longitudinal edges turned 90 degrees toward the same side such that both ramp members 18 and 20 comprise essentially flat upper ramp surfaces 22 with side strips 24 on each side thereof, parallel to each other and extending in the same direction. The length and width of ramp members 18 and 20 are approximately the same as the width and height of the mounting plate frame section 14 and the width of the side strips 24 is approximately the same as the width of the base plate frame section 16. The ramp member upper surface 22 is on the side opposite to the direction of extension of side strips 24 and surface 22 may De scored, indented or otherwise modified to improve traction and guidance of small wheeled vehicles. Ramp members 18 and 20 further comprise a support end 26 and a ground end 28. The side strips 24 at ground end 28 are cut away at an angle to allow the ramp number surface 22 to meet the ground without a gap, said angle being determined by the height of the truck load bed and the length of the ramp members 18 and 20. At the ramp member support end 26, strips 24 are rounded to allow ramp members 18 and 20 to pivot as is hereinafter described.

Ramp member 18 is of the same overall configuration as ramp member 20, but is slightly narrower than ramp member 20 by at least twice the thickness of the material from which ramp member 20 is fabricated such that the outer dimensions of ramp member 18 are slightly less than the inner dimensions of ramp member 20. As is hereinafter described, the ramp members 18 and 20 are stored In a nested manner, requiring the size difference.

The loading mechanism 10 further comprises two support rods 50 and 30, both support rods 50 and 30 being essentially identical to each other. The support rods 50 and 30 are comprised of two rod shaped sections joined by a flexible hinge joint 32. A first support rod section 34 is approximately as long as the ramp members are wide and comprise a hinged end 52 at which it is joined by hinge joint 32 to the second support rod section 38 and a mounting end 36 which is permanently and rigidly attached to base plate section 16 at one end thereof in a vertical position. The second rod section 38 is slightly longer than one-half the length or the ramp members 18 and 20, extending from hinge joint 32 to a support end 40. Second rod section 38 is movable between a vertical position above and in line with first rod section 34 and a second, horizontal position, parallel and proximate to the upper edge 54 of mounting plate section 14. Hinge joint 32 allows the second rod section 38 to pivot about a hinge pin 64 and is formed such that when the first and second rod sections 34 and 38 are aligned on a common axis, the surface at hinge 32 is smooth and presents no hinderance to sliding the ramp member across the hinge 32. Hinge 32 also is formed with a spring loaded detent to releasibly lock the rod sections 34 and 38 in either straight alignment or at a 90 degree angle to each other. A bracket support member 42 formed of ordinary angle iron is attached to the rearward surface of mounting plate section 14 toward the upper edge 54 thereof. In the center bracket support member 42, two parallel laterally displaced brackets 56 are supported by and attached to bracket support member 42, each having upwardly open semi-circular indentations 58 for receiving the support end 40 of the second rod sections 38 such that the support end 40 of the rod section 38 can be removed from the brackets 56 only by movement in the vertical plane. Each strip 24 at ramp member support end 26 forms an opening 44 the size and shape slightly larger than the cross section of the second and first support rod sections 38 and 34. When stored, the smaller ramp section 18 is arranged so that the first support rod section 34 of support rod 50 traverses the openings 44 in strips 24 and ramp member 18 is pivoted on first support rod section 34 into a position parallel to the mounting plate section 14 and proximate thereto. After ramp member 18 has been moved into storage position, second support rod section 38 of support rod 50 is lowered to horizontal position and support end 40 is secured in bracket 56. The larger ramp member 20 is similarly arranged in horizontal position on edge, its support end 26 being traversed and supported by first support rod section 34 and is pivoted on first rod section 34 into storage position rearward of and proximate to the smaller ramp member 18 and parallel thereto. The second support rod section 38 of support rod 30 is similarly secured in a bracket 56. After both ramp members have been placed in storage position, a pin 46 is inserted into a series of holes 60 in the strips 24 of the ramp members 18 and 20 and in the bracket support member 42 which holes 60 are only aligned when the ramp members 18 and 20 are properly stored, thereby securely restraining both ramp members from movement out of storage position. In the illustrated preferred embodiment of loading mechanism 10, pin 46 is used with a license plate display bracket 62 which extends rearward and downward to display a motor vehicle license plate and to prevent pin 46 from further downward movement.

It should be anticipated that the features of loading mechanism 10 while specifically designed for use as a means for providing a loading ramp of variable width for a small truck, could be modified for use in other similar circumstances.

It should be further understood and anticipated that numerous materials could be utilized for the components of loading mechanism 10 provided the overall strength of the mechanism is sufficient to withstand the forces to be anticipated.

While preferred embodiments of the foregoing invention have been set forth for purposes of illustration, the foregoing description should not be deemed a limitation of the invention herein. Accordingly, various modifications, adaptations and alternatives may occur to one skilled in the art without departing from the spirit and the scope of the present invention.

What is claimed is:

1. A loading ramp mechanism for attachment to the rear end of the cargo bed of a vehicle having a cargo bed and a centerline, the mechanism comprising a rectangular ramp member having a generally flat surface and being movable from a deployed position wherein one edge of said ramp member is in close proximity to the rear edge of the vehicle cargo bed and said ramp member extends toward a surface, to a storage position wherein said ramp member is outside of the cargo bed and the flat surface of said ramp member is normal to the centerline of the vehicle, and a first rod shaped member secured in a vertical position for supporting said ramp member in said storage position, and a second rod shaped member flexibly joined to the first rod shaped member and movable from a vertical to a horizontal position to support said ramp member in said deployed position, and means for allowing the lateral placement of said ramp member when in said deployed position.

2. The mechanism of claim 1 wherein the means for allowing lateral placement of said ramp member comprises a means for slidably securing one edge of said ramp member to the second rod shaped member.

3. The loading mechanism of claim 2 further comprising means for locking said ramp member in the storage position.

4. A loading ramp mechanism for attachment to the rear end of the cargo bed of a vehicle having a cargo bed, a rear bumper and a centerline, the mechanism comprising a plurality of rectangular ramp members each having a generally flat surface and being movable from a deployed position in which one edge of each of said ramp members is in close proximity to the rear edge of the vehicle cargo bed and said ramp members extend toward a surface, to a storage position wherein each said ramp member is outside of the cargo bed and the surface of each said ramp member is normal to the centerline of the vehicle, and two rod shaped members secured in a vertical position for supporting said ramp members in said storage position, and two rod shaped supports, each being flexibly joined to one of the vertical rod shaped members and movable from a vertical to a horizontal position to support said ramp member in said deployed position, and means for allowing the lateral placement of each of said ramp members when in said deployed position.

5. The mechanism of claim 4 wherein the means for lateral placement of said ramp members comprises a means for slidably securing one edge of each of said ramp members to one of the rod shaped supports.

6. The mechanism of claim 4 further comprising means for locking each of said ramp members in said storage position.

7. The mechanism of claim 6 wherein each of said vertical rod shaped members may be mounted proximate to one of the lateral ends of the rear bumper of the vehicle.

* * * * *